United States Patent [19]
Maugein et al.

[11] Patent Number: 4,788,396
[45] Date of Patent: Nov. 29, 1988

[54] METHOD OF SINTERING BY INDUCTION

[75] Inventors: Christian Maugein, Saint Germain du Puch; Roland Ernst, Grenoble, both of France

[73] Assignee: Centre National de la Recherche Scientifique G.I.S. Madylam, Grenoble, France

[21] Appl. No.: 130,221

[22] Filed: Dec. 8, 1987

[30] Foreign Application Priority Data

Dec. 11, 1986 [FR] France .................. 86 17357

[51] Int. Cl.$^4$ .............................................. H05B 6/40
[52] U.S. Cl. ............................ 219/10.43; 219/10.57; 219/10.61 R; 219/10.79; 266/129
[58] Field of Search ............... 219/10.41, 10.43, 10.57, 219/10.61 R, 10.71, 10.79; 148/150, 154; 266/129

[56] References Cited
U.S. PATENT DOCUMENTS 3,031,555  4/1962  Ross et al. ....................... 219/10.79
3,766,353  10/1973  Barbieux ....................... 219/10.61 R
4,185,183  10/1980  Kamimoto ..................... 219/10.61 R
4,234,776  11/1980  Rudd et al. .................... 219/10.43 X
4,627,259  12/1986  Andersson et al. ............ 219/10.43 X

FOREIGN PATENT DOCUMENTS 3015981  11/1981  Fed. Rep. of Germany.

Primary Examiner—Philip H. Leung
Attorney, Agent, or Firm—Kenyon & Kenyon

[57] ABSTRACT

An electrode composed of a mixture of electrochemically active particles and metal powder compressed onto a metal foil strip can be inductively sintered without localized overheating by passing the coated strip through a hairpin-shaped inductor provided with widened portions facing the edge regions of the strip, so as to locally increase the cross section of the hairpin in the portions of the hairpin that are opposed to the edge regions of the electrode strip. This arrangement counteracts the tendency of the edge regions to overheat and thermally damage the active material.

6 Claims, 4 Drawing Sheets

METHOD OF SINTERING BY INDUCTION

The present invention relates to a method of sintering by induction, as applied, in particular, to an electrode for an electrochemical cell.

BACKGROUND OF THE INVENTION

The electrode is in the form of a strip comprising a metal foil having a mixture of powders pressed thereon, said powders including metal powder and electrochemically active material in powder form. The strip runs continuously through an inductor as described in U.S. Pat. No. 4,514,473. The high frequency current flowing through the inductor steps up an electromagnetic field which induces electrical "eddy" currents in the strip. The heating that results therefrom sinters the metal powder which in turn imprisons the powder grains of active material.

A problem which arises in this type of application is achieving sintering of the metal grains without thermally decomposing the grains of active material.

If inductors are used of the type described in U.S. Pat. No. 3,444,346, a satisfactory result is not obtained since the time required for sintering is such that the active material is heated for too long and is damaged.

If a hairpin-shaped inductor is used having its branches on either side of the strip running perpendicularly to the direction of strip displacement, as described in German patent application No. DE 30 15 981, it is observed that although the temperature obtained in the central part of the strip is satisfactory for obtaining good quality sintering, the edges of the strip are overheated because of edge effects. This gives rise to several drawbacks. Firstly the grains of active material situated in the vicinity of the edges are damaged, and the yield or efficiency of the electrode is reduced. Secondly, certain additives, such as cadmium, are completely unuseable since they sublime at the temperature levels reached. This also pollutes the environment.

In order to avoid these drawbacks, proposals have been made to cool the edges of such strips using a gas, however this process is difficult to control and is inaccurate.

Proposals have also been made to use an inductor, for example in the form of a metal foil, capable of treating simultaneously a larger area of the strip, thereby obtaining a more uniform temperature distribution. It has been observed that such a solution is unsuitable since even though the grains of active material receive, overall, the same total energy as when using a hairpin-shaped inductor, the greater duration of the operation renders them electrochemically inactive.

The present invention therefore seeks to implement a method making it possible to control the temperature at the edges of the strip without modifying the central portion of the temperature profile obtained when using a hairpin-shaped inductor.

SUMMARY OF THE INVENTION

The present invention provides a method of sintering an electrode for an electrochemical cell by induction, said electrode being constituted by a metal strip having a mixture of metal powder and of active material powder previously compressed onto the faces thereof, the method comprising passing said strip through an inductor having a high frequency current flowing therein, said inductor being generally in the form of a hairpin with its two branches being situated on opposite sides of said strip and extending perpendicularly to its direction of displacement, the method being characterized by the fact that each branch of said hairpin is provided with widened portions facing those zones of the strip where the heating temperature is to be lowered, said widened portions extending parallel to the strip and serving to locally increase the cross-section through which the inducing current passes.

Any part of the electrode may be treated in this way, however it is essential for the edges to be treated. The result of the treatment is firstly to reduce the induced current and magnetic field, and secondly to give rise to greater heat losses, thereby eliminating the excess heating that was previously observed.

The invention also provides an inductor for implementing the above method. The inductor is characterized by the fact that it is in the form of a two-branch hairpin, with each of the branches having at least one widened portion extending orthogonally to the plane formed by said branches, in the vicinity of the ends thereof.

In a first embodiment, said widened portions are constituted by metal plates added to said branches.

In a second embodiment, said branches are machined in solid material so as to have said widened portions.

BRIEF DESCRIPTION OF THE DRAWINGS

Implementations of the invention are described by way of example with reference to the accompanying drawings, in which.

MORE DETAILED DESCRIPTION

Figure 1:
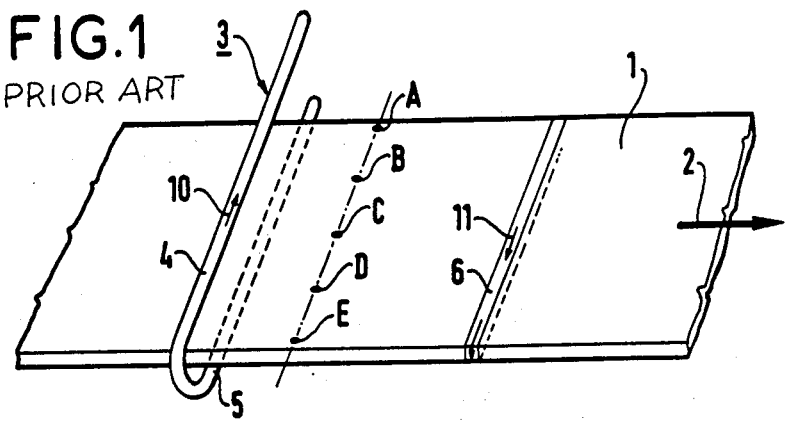
FIG. 1 is a diagram showing the prior art induction method of heating a strip.

FIG. 1 is a diagram showing a strip-shaped electrode 1 running through an inductor 3 in the direction indicated by arrow 2. The strip 1 is constituted by a perforated steel foil which is 35 mm wide and 0.1 mm thick, and which is covered with a mixture of metal powder and of active material in powder form, except for a width of about 1 mm along its side edges. The thickness of the compressed powder layer is about 0.6 mm.

Figure 4:
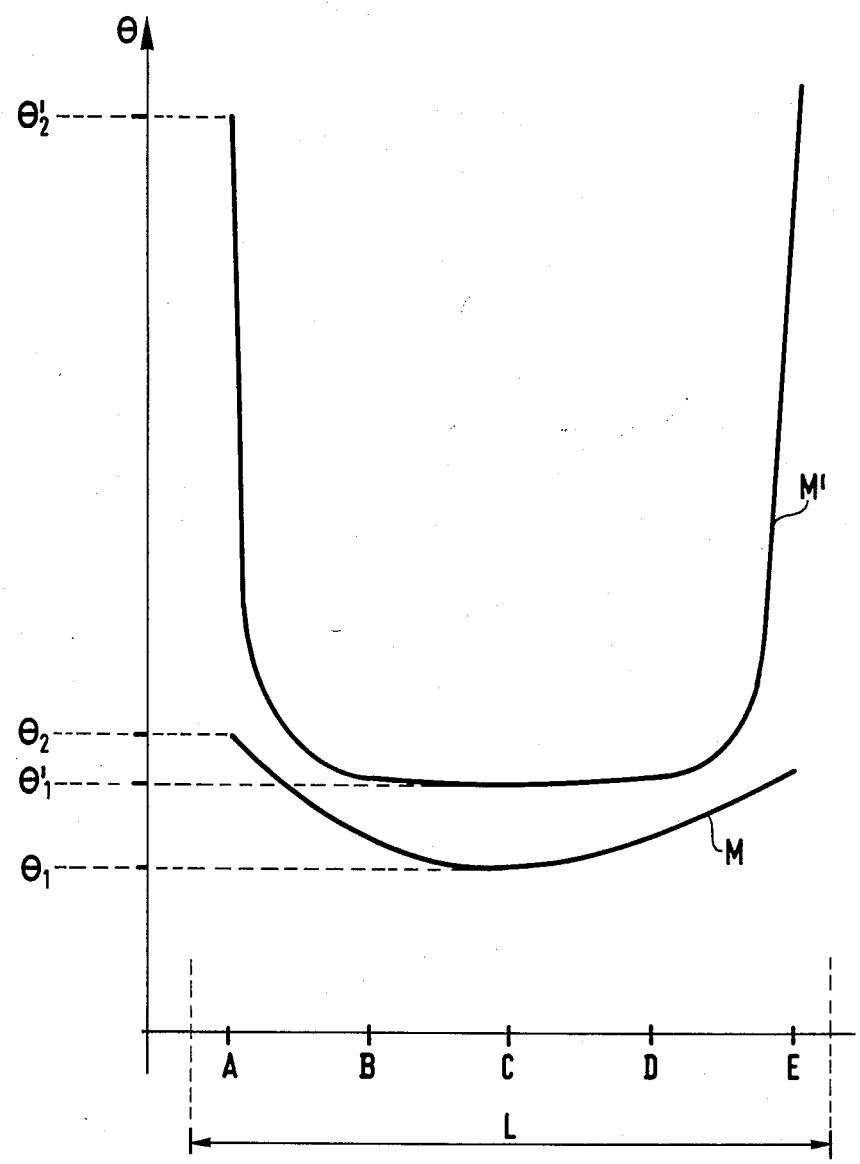
FIG. 4 is a graph of the temperature distribution across the width L of a strip treated by the prior art method, and also across the width L of a strip treated by the method in accordance with the invention.

The inductor 3 is hairpin-shaped having two branches 4 and 5 situated on opposite sides of the strip 1. When the strip 1 passes through the inductor 3 the inducing current 10 induces an induced current 11 which occupies a generally rectangular zone 6 lying between the branches. If the temperature of the strip across its width L is then measured at regularly spaced points A, B, C, D, and E, the distribution of temperature θ shown by curve M' in FIG. 4 is observed. (For reasons of clarity, the inductor 3, the zone 6, and the zone in which the points A, B, C, D, and E are marked are all shown spaced apart from one another in FIG. 1.) By way of example, $\theta'_1$ is 345° C. with $\theta'_2$ lying between 355° C. to 470° C.

Figure 2:
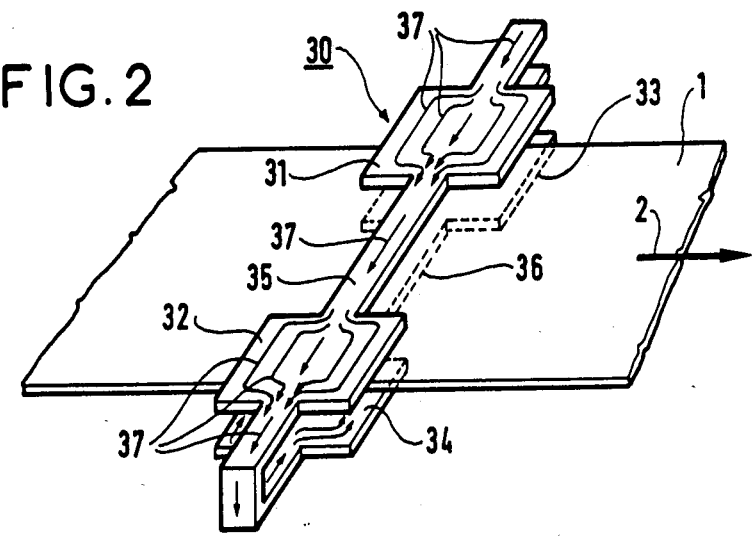
FIG. 2 is a diagram of an example of an inductor used for implementing the method in accordance with the invention.

FIG. 2 shows the same strip 1 running in the direction indicated by arrow 2 through an inductor 30 in accordance with the invention. This inductor has two branches 35 and 36 which are provided at their ends with portions 31, 32, 33, and 34 which are widened parallel to the strip 1. The branches shown are machined in a single piece, but an equivalent shape could be obtained by adding metal parts to the FIG. 1 inductor 3. Arrows 37 represent the inducing current.

The speed at which the electrode moves lies between 1 meter (m) per minute and 10 m per minute. The temperature rise time (to about 350° C.) lies between 0.1 seconds and 1.5 seconds depending on the speed of displacement.

For example, for a displacement speed of 3 m per minute, the desired temperature rise is obtained in a time of not more than 0.5 seconds. This is made possible by the shape of the inductor which generates a narrow field, having a width of about 25 mm in the middle of the electrode.

Figure 3:
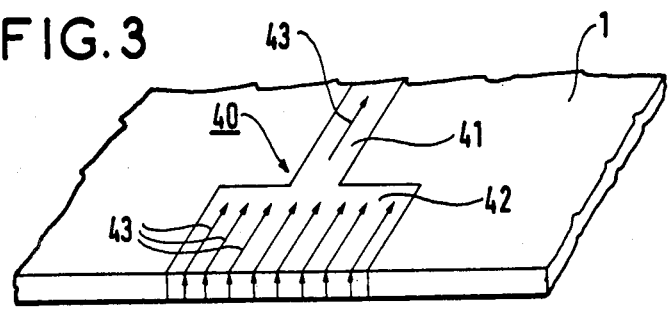
FIG. 3 is a diagram of the distribution of induced current in the strip as it passes through the FIG. 2 inductor.

FIG. 3 shows a zone 40 of the strip 1 as it passes through the inductor 30. Arrows 43 represent the current induced in the zone 40 which is split into a zone 41 having a resistance R and a wider zone 42 having a resistance r. In the zone 41 having a narrow current-passing cross-section, the local heating effect power is much greater than the local heating effect power in the zone 42 having a large cross-section for passing the current 43. In addition, the heat exchange area applicable to the zone 42 is greater than that applicable to the zone 41. Consequently, heat losses due to conduction, convection, and radiation are also greater.

In FIG. 4, curve M represents the temperature distribution across the width of the strip 1 at the same points A, B, C, D, and E. It can be seen that the temperature gradient which was as much as 36% (curve M') between the center and the edge of the strip is now reduced to 7% (curve M).

The hairpin per se may be constituted by a copper tube having a diameter of 4 mm, for example. By way of example the widened portions may be several tens of millimeters wide, e.g., 20 mm, 30 mm, or 40 mm.

The width of the edge of the electrode which is treated by the widened inductor may be about 5 mm.

Naturally, the shape of the widened portions is not imited to that shown.

Figure 5:
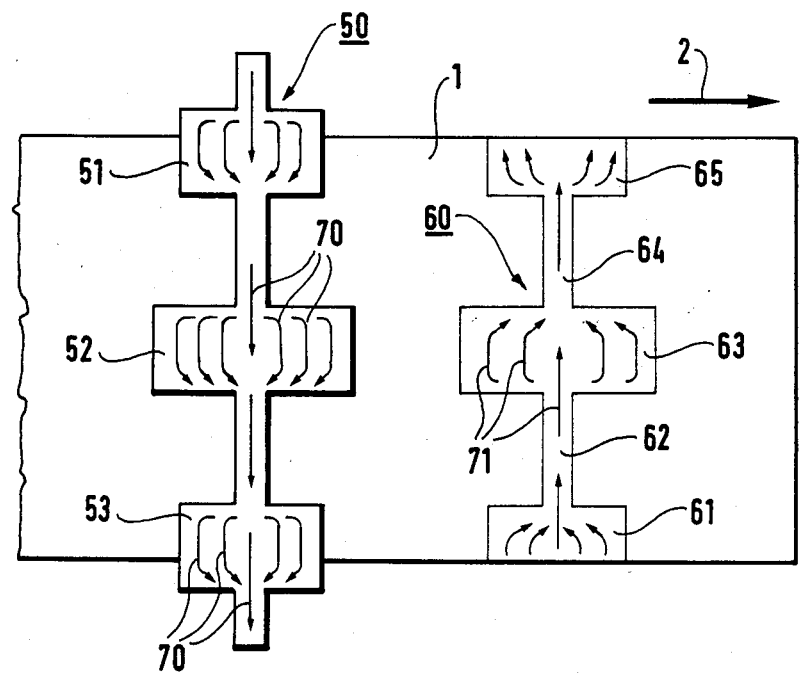
FIG. 5 is a diagram of a variant implementation of the method in accordance with the invention, as seen from above.
Figure 6:
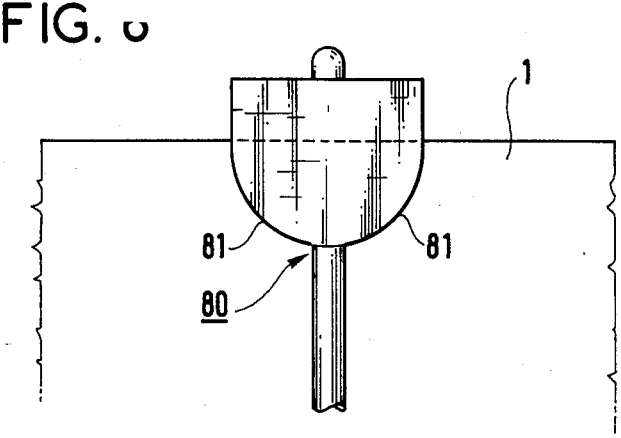
FIGS. 6, 7, and 8 are highly diagrammatic fragmentary views of three variants of an inductor in accordance with the invention.
Figure 7:
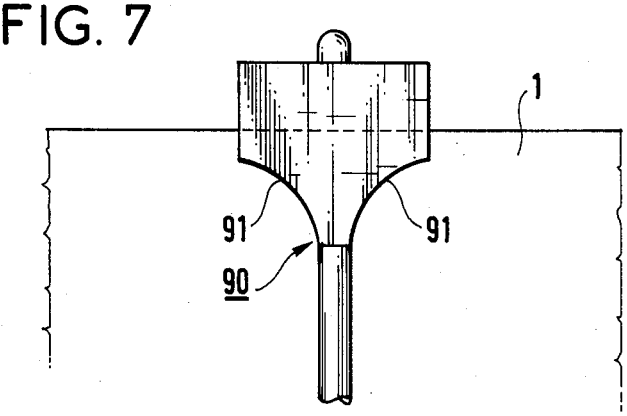
Figure 8:
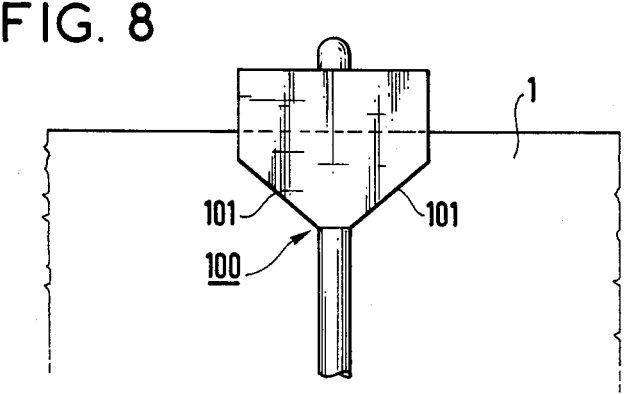

Thus, the square or rectangular widening shown in FIGS. 2 and 5 could be replaced by a widening of the kind shown in any one of FIGS. 6 to 8.

In FIG. 6, the hairpin 80 has a widened portion which is symmetrical about the branches of the hairpin and which is in the form of a portion of a circle 81.

In FIG. 7, the hairpin 90 has a widened portion which is symmetrical about the branches thereof, and which is limited by portions of concave curves 91.

In FIG. 8, the hairpin 100 has a widened portion which is trapesium-shaped and is delimited by two straight lines 101.

These variants are merely examples.

Further, it may be envisaged, in some applications, also to treat zones of the strip 1 other than its edges.

FIG. 5 shows an inductor 50 of the same type as that shown in FIG. 2, but having three widened portions 51, 52, and 53 for setting up a lower temperature central zone. The inducing current is referenced 70. The zone 60 treated by the inductor is illustrated to the right of the figure and shows the induced current 71 having the following zones: 61 ($r_1$, $T_1$), 62 ($R_2$, $T_2$), 63 ($r_3$, $T_3$), 64 ($R_4$, $T_4$); and 65 ($r_5$, $T_5$), where the letters r and represent resistances and T represent temperatures. Such a disposition is applicable when the strip not only has side edges without any active material, but also has a non-perforated wiped central strip suitable for being subsequently cut so as to make two electrodes simultaneously.

Naturally, without going beyond the scope of the invention, it would be possible to replace any of its means by equivalent means.

We claim:

1. A method of sintering by induction an electrode for an electrochemical cell, said electrode being constituted by a metal strip having a mixture of metal powder and of active material powder previously compressed onto the faces thereof, the method comprising displacing said strip longitudinally through an inductor having a high frequency current flowing therein, said inductor being generally in the form of a hairpin having two branches situated on opposite sides of said strip and extending perpendicularly to its direction of displacement, wherein the improvement comprises: providing each branch of said hairpin with widened portions extending parallel to the strip in the zones facing the edges of the strip so as to serve to locally increase the cross-section through which the inducing current passes in such a way that the whole electrode remains at a uniform temperature suitable to sintering said metal powder without damage to said active material powder.

2. A sintering method according to claim 1, wherein said metal strip is constituted by a perforated metal foil having a linear non-perforated zone running substantially along the middle thereof, with additional widened portions being provided on the branches of said hairpin inductor where they face said linear zone.

3. A sintering method according to claim 1, wherein the displacement speed of said strip lies between 1 meter per minute and 10 meters per minute, and the temperature rise time in the heated zone lies between 0.1 seconds and 1.5 seconds.

4. In an apparatus of sintering by induction an electrode for an electromechanical cell, said electrode being constituted by a metal strip having a mixture of metal powder and of active material powder previously compressed on the faces thereof, an inductor being generally in the form of a hairpin having two branches situated on opposite sides of said strip and extending perpendicularly to the edges of the strip, wherein each of the branches has at least one widened portion extending orthogonally to the plane formed by said branches, in the vicinity of the edges of the electrode strip.

5. The apparatus according to claim 4, wherein said widened portions of said inductor are constituted by metal plates added to said branches of said inductor.

6. The apparatus according to claim 4, wherein said branches of said inductor are machined in solid material so as to have said widened portions of said inductor.

* * * * *